(12) United States Patent
Nii et al.

(10) Patent No.: US 7,559,697 B2
(45) Date of Patent: Jul. 14, 2009

(54) DYNAMIC BEARING UNIT

(75) Inventors: Katsutoshi Nii, Matsudo (JP); Hideo Shikata, Matsudo (JP)

(73) Assignee: Hitachi Powdered Metals Co., Ltd., Matsudo-shi (JP)

( * ) Notice: Subject to any disclaimer, the term of this patent is extended or adjusted under 35 U.S.C. 154(b) by 385 days.

(21) Appl. No.: 11/644,006

(22) Filed: Dec. 22, 2006

(65) Prior Publication Data
US 2007/0144833 A1 Jun. 28, 2007

(30) Foreign Application Priority Data
Dec. 27, 2005 (JP) .............................. 2005-373772

(51) Int. Cl.
*F16C 32/06* (2006.01)
(52) U.S. Cl. .................... 384/121; 384/107; 384/112
(58) Field of Classification Search ................ 384/100, 384/107, 112, 121, 123, 124; 360/99.08, 360/98.07; 310/90
See application file for complete search history.

(56) References Cited

U.S. PATENT DOCUMENTS

| | | | |
|---|---|---|---|
| 6,371,651 B1 * | 4/2002 | Fujii et al. .................. | 384/121 |
| 6,431,757 B1 * | 8/2002 | Nakazeki et al. ............ | 384/107 |
| 6,552,456 B2 * | 4/2003 | Goto et al. .................... | 310/90 |
| 6,712,514 B2 | 3/2004 | Mori et al. | |
| 6,836,040 B2 * | 12/2004 | Watanabe et al. ............. | 310/90 |
| 6,981,797 B2 | 1/2006 | Mori et al. | |
| 2001/0005436 A1 * | 6/2001 | Sjostrom et al. ............ | 384/123 |
| 2004/0061394 A1 * | 4/2004 | Gotoh et al. .................. | 310/90 |
| 2004/0156569 A1 * | 8/2004 | Takeuchi et al. ............ | 384/107 |

FOREIGN PATENT DOCUMENTS

JP   A 2005-188753   7/2005

* cited by examiner

*Primary Examiner*—Thomas R Hannon
(74) *Attorney, Agent, or Firm*—Oliff & Berridge, PLC

(57) ABSTRACT

A fluid dynamic pressure effect can be sufficient without receiving a large effect of viscous friction of lubricating oil with changes in the environmental temperature in which it is used, and smooth starting of the rotating shaft can be ensured by regulating the gap between the rotating shaft and bearing within a suitable range. An outer diameter of the bearing, D, a length in an axial direction of the bearing, L, a gap at a radial side which is between the rotating shaft and the bearing, C, and an inclining height of the bearing end surface to which the flange is faced, $\delta$, satisfy the expression $L/D<C/\delta$. It is preferable that the inclining height, $\delta$, be 2 to 6 μm, the inner diameter of the bearing be 1 to 3 μm, and the gap at a radial side, C, be 1 to 4 μm.

4 Claims, 4 Drawing Sheets

DYNAMIC BEARING UNIT

BACKGROUND OF THE INVENTION

1. Field of the Invention

The present invention relates to a fluid dynamic pressure bearing unit in which both loads in a radial direction and a thrust direction of the rotating shaft are supported in a non-contact condition by fluid dynamic pressure of lubricating oil supplied in a gap between a bearing and a rotating shaft during the rotating of the rotating shaft. The fluid dynamic pressure bearing unit of the present invention is preferably used as a bearing unit of a spindle motor used as a driving motor for various kinds of information devices such as driving units in disc drive devices which read and write information from and to a magnetic disc or an optical disc, polygon motors in laser printers, etc.

2. Description of Related Art

With respect to such spindle motors for information devices, in order to increase the recording density and to increase the speed for transferring data, rotating performance at high speed and with high precision is desired. A non-contact type of fluid dynamic pressure bearing has widely been adopted as a bearing which supports a rotating shaft in recent years for motors which are superior in these characteristics. In the fluid dynamic pressure bearing, an oil film is formed by supplying lubricating oil in a small gap between the rotating shaft and the bearing, and the oil film is compressed by the fluid dynamic pressure of the lubricating oil generated due to rotation of the rotating shaft, so that the rotating shaft is supported with high rigidity by the compressed oil film. In the fluid dynamic pressure bearing, the fluid dynamic pressure is effectively generated by a groove (a fluid dynamic pressure groove) for generation of the fluid dynamic pressure formed on one of the sliding surfaces of the rotating shaft and the bearing.

The bearings for spindle motors are constructed such that a load in a thrust direction is supported in addition to the usual load in a radial direction. A flange, which is integrally formed in the rotating shaft, is slidably faced to an end surface of the bearing, so that the thrust load on the rotating shaft is supported on the end surface of the bearing through the flange. The above fluid dynamic pressure is generated in both the thrust direction and the radial direction. That is, a thrust fluid dynamic pressure groove is formed on either the flange of the rotating shaft or the end surface of the bearing, which face each other, and a radial fluid dynamic pressure groove is formed on either an inner peripheral surface of the bearing or an outer peripheral surface of the rotating shaft which faces the inner peripheral surface. In the fluid dynamic pressure grooves, the shape and depth are designed so that an oil film of lubricating oil is compressed with rotation of the rotating shaft, and for example, the shape of the groove may be generally wedge-shaped in which width and depth are smaller and narrower in a rotating direction of the rotating shaft, etc.

It is preferable that the gap (bearing gap) between the rotating shaft and the bearing in which an oil film is formed be narrower since oil pressure is easily increased and the bearing rigidity is improved. In other words, bearing performance is decided by management or control of the bearing gap. For example, Japanese Unexamined Patent Application Publication No. 2005-188753 discloses an invention in which bearing gaps at a radial side and a thrust side are justified by setting squareness and flatness of the bearing end surface to specific values.

When the bearing gap is increased, since fluid dynamic pressure is not increased sufficiently by lowering oil film pressure and a tendency toward low bearing rigidity is observed. Furthermore, when a reduction in the viscosity of the lubricating oil is promoted by a temperature increase (about 60° C.) with continuous operation of the spindle motor, the bearing rigidity is remarkably insufficient. Therefore, as described in the above publication, it is effective that the bearing gap be designed to the specified values or less and be as small as possible. However, when the bearing gap is too small, there is a problem in that the motor is difficult to start due to increased viscous friction of the lubricating oil, that is, the stationary rotating shaft is difficult to rotate. In particular, at a thrust side at which the flange tends to tightly come into contact with the bearing end surface by gravity when the rotating shaft stops, such a starting problem easily occurs, and in the case in which the environmental temperature in which it is used is low, for example, below 0° C., there is a problem in that the motor cannot be started due to increased viscous friction of the lubricating oil. In addition, in a spindle motor which uses battery power at the same time in a portable device such as a notebook-type PC (personal computer), starting torque is small. In such spindle motor, miniaturization of the bearing gap is limited from the viewpoint of the starting.

In contrast, in the case in which the inclining height of the rotating shaft is large, squareness accuracy of the bearing end surface which receives thrust load from the flange of the rotating shaft is low. Therefore the rotating shaft is inclined and comes into contact with the inner peripheral surface by coming into contact the flange with the bearing end surface, and increasing friction interferes with the starting. Furthermore, when the flange and the bearing are made from different materials, the gap is further narrowed by thermal expansion difference thereof, and the above various problems due to the narrow gap conspicuously occur.

SUMMARY OF THE INVENTION

An object of the present invention is to provide a fluid dynamic pressure bearing unit which controls the inclining height of the rotating shaft so as to prevent the rotating shaft from coming into contact with the inner peripheral surface of the bearing and regulates the bearing gap at a thrust side within a suitable range. In the fluid dynamic pressure unit of the present invention, a fluid dynamic pressure effect can be sufficiently demonstrated without receiving a large effect of viscous friction of lubricating oil with changes in the environmental temperature in which it is used, and smooth starting of the rotating shaft can be ensured.

In a fluid dynamic pressure bearing unit of a type in which the thrust load of a rotating shaft is supported by receiving a flange provided on the rotating shaft to a bearing end surface, the inventors intensively researched conditions in which a shaft body of the rotating shaft comes into contact with an inner peripheral surface of the bearing. As a result, the inventors noticed the relationship between an inclining height of the bearing end surface in which inclination of the rotating shaft is promoted by coming into contact the flange with a gap at a radial side which is between the shaft body of the rotating shaft inserted in the bearing and the inner peripheral surface. They found that in the case in which an outer diameter of the bearing, $D$, a length in an axial direction of the bearing, $L$, a gap at a radial side which is between the rotating shaft and the bearing, $C$, and an inclining height of the bearing end surface to which the flange is faced, $\delta$, satisfy the expression $L/D < C/\delta$, the shaft body does not come into contact with the inner peripheral surface of the bearing, and the viscous friction which is generated in the bearing gap at a thrust side is reduced.

A fluid dynamic pressure bearing unit of the present invention was made based on the above findings. The fluid dynamic pressure bearing unit of the present invention includes a rotating shaft in which a flange is provided on a cylindrical shaft body. The fluid dynamic pressure bearing unit of the present invention further includes a cylindrical bearing in which the shaft body of the rotating shaft is rotatably inserted and in which the flange is faced to a bearing end surface in this state. In addition, the fluid dynamic pressure bearing unit of the present invention includes a thrust dynamic pressure groove formed on one of the faced surfaces of the flange and the bearing end surface. Furthermore, the fluid dynamic pressure bearing unit of the present invention further includes a radial dynamic pressure groove formed on one of an inner peripheral surface of the bearing and an outer peripheral surface of the shaft body which faces to the inner peripheral surface. Additionally, the fluid dynamic pressure bearing unit of the present invention includes lubricating oil supplied to a gap formed between the rotating shaft and the bearing. In the fluid dynamic pressure bearing unit of the present invention, fluid dynamic pressure is generated by the lubricating oil supplied to the thrust dynamic pressure groove and the radial dynamic pressure groove when the rotating shaft rotates, so that the rotating shaft is supported in a thrust direction and a radial direction on the bearing in a non-contact condition by the dynamic pressure. Furthermore, in the fluid dynamic pressure bearing unit of the present invention, an outer diameter of the bearing, D, a length in an axial direction of the bearing, L, a gap at a radial side which is between the rotating shaft and the bearing, C, and an inclining height of the bearing end surface to which the flange is faced, δ, satisfy the expression $L/D < C/\delta$.

According to the present invention, by satisfying the above expression, the flange of the rotating shaft comes into contact with the bearing end surface, and the shaft body does not come into contact with the inner peripheral surface of the bearing, even if the rotating shaft is inclined. For example, in the case in which L/D is 1, when the inclining height of the bearing end surface δ is set to be below the gap at a radial side C, the flange comes into contact with an inclined surface of the bearing end surface, and the shaft body does not come into contact with the inner peripheral surface even if the flange is inclined according to the inclination of the bearing. In the case in which L/D is 0.2, the shaft body does not come into contact with the bearing even if δ is several times C. Generally, in this type of the bearing, C is 1 to 4 μm when L/D at about 0.5, and therefore, the bearing end surface may be processed so that δ is 8 μm or less.

In addition, friction torque at start up is equal to viscous friction of lubricating oil supplied to the bearing gap at a radial side and a thrust side. In this case, the higher the machining accuracy of the flange and the bearing end surface, the narrower the bearing gap at a thrust side. As a result, the shaft body of the rotating shaft does not come into contact with the inner peripheral surface. However, when the bearing gap at a thrust side is about 1 μm, the viscous friction is remarkably increased and starting characteristics are degraded. Therefore, it is preferable that the inclining height δ of the bearing end surface which forms the bearing gap at a thrust side be 2 to 6 μm.

In the present invention, as a material of the bearing, sintered metal in which compact pressed metal powder as a raw material is sintered may be preferably used since the thrust dynamic pressure groove and the radial dynamic pressure groove are easily formed on the surface of the sintered metal. The dynamic pressure grooves can be easily formed by a plastic working such as by a coining, etc.

According to the present invention, by suitably regulating the inclining height of the bearing end surface in which the flange of the rotating shaft comes into contact and the bearing gap at a radial side based on an outer diameter and a length in an axial direction of the bearing, a fluid dynamic pressure bearing unit in which the rotating shaft does not come into contact with the inner peripheral surface of the bearing and dynamic pressure effect and starting characteristics are sufficiently demonstrated even under conditions at high temperatures or low temperatures, can be provided.

DESCRIPTION OF THE PREFERRED EMBODIMENTS

Embodiments of the present invention will be described hereinafter with reference to the drawings.

Figure 1:
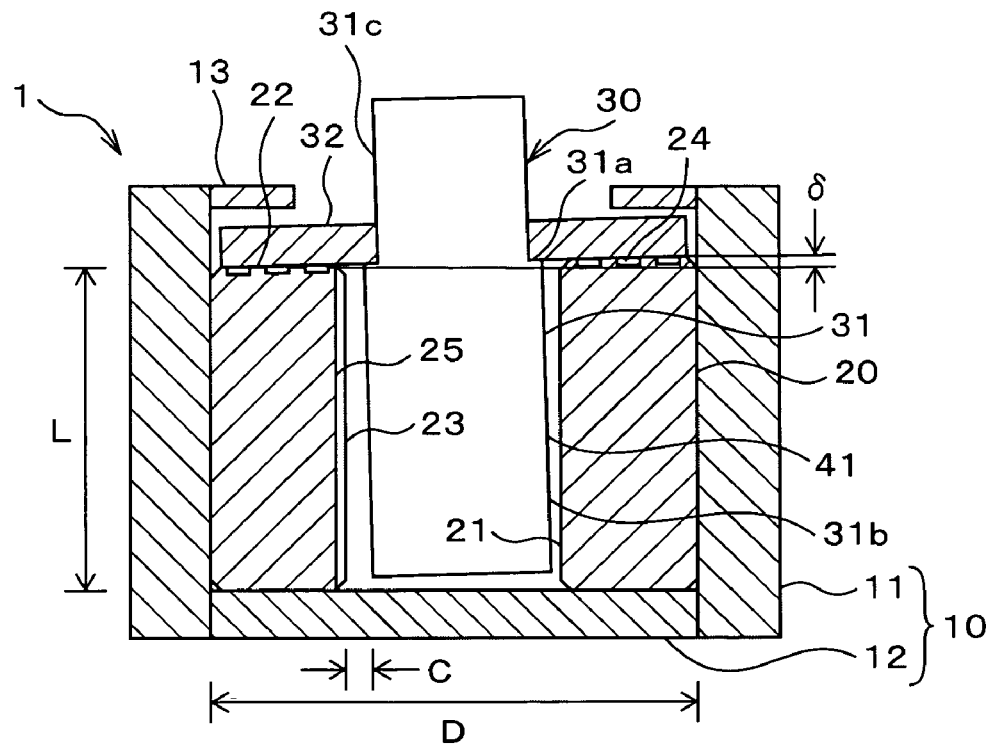
FIG. 1 is a longitudinal cross sectional view of a fluid dynamic pressure bearing unit of an embodiment according to the present invention.
Figure 2:
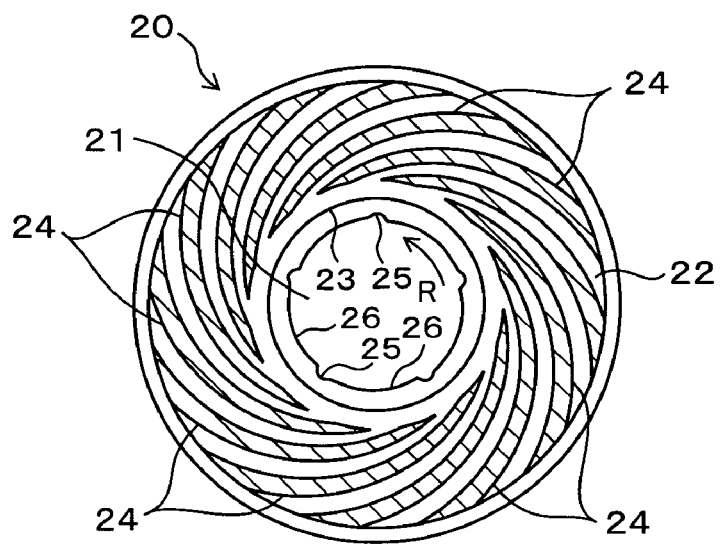
FIG. 2 is a plane view of a bearing which is a component of the fluid dynamic pressure bearing unit shown in FIG. 1.
Figure 3:
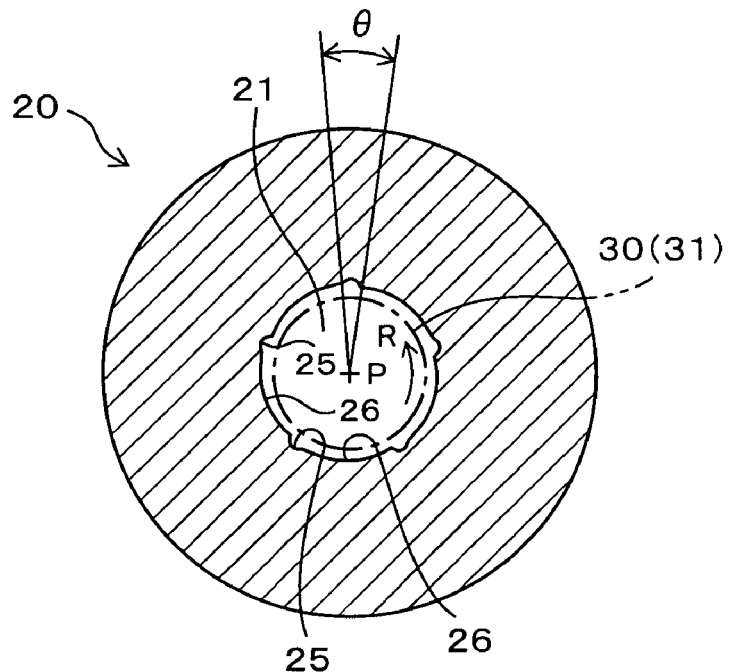
FIG. 3 is a cross sectional view of the bearing.

FIG. 1 shows a longitudinal cross sectional view of a fluid dynamic pressure bearing unit 1 of an embodiment according to the present invention. FIG. 2 is a plane view of a bearing, and FIG. 3 is a cross sectional view of the bearing. The fluid dynamic pressure bearing unit 1 is a bearing unit which is suitable for a spindle motor in a magnetic recording disk drive unit, and it has a cylindrical bearing having an outer diameter of about 6 mm, indicated by reference numeral 20, and it rotatably supports a rotating shift 30 which is inserted into a shaft hole 21 and has a diameter of 3 mm.

As shown in FIG. 1, the fluid dynamic pressure bearing unit 1 is composed of a housing 10 which is cylindrical and has an opening at the upper side in the Figure, and it has a bottom, a bearing 20 which is contained in the housing 10, and a rotating shaft 30 which is rotatably supported by the bearing 20. The housing 10 has a cylindrical housing body 11 and a disc-shaped bottom plate 12 which is fixed at an inner peripheral edge of the under side in the opening of the housing body 11 by a welding means such as an electron beam, laser, etc., so as to hermetically seal the opening. The bearing 20 is press-fitted into the housing body 11, or it is fixed in the housing 10 by being inserted into the housing body 11 by welding, adhesion, etc.

The rotating shaft 30 has a shaft body 31 and a ring-shaped flange 32 integrally fixed to the shaft body 31, and both members are formed from ingot materials such as brass, stainless steel, etc. The flange 32 is stopped at a step portion 31a formed on an outer peripheral surface of the shaft body 31, and thereby positioning in an axial direction is carried out. The shaft body 31 is divided into a large diameter portion 31b and a small diameter portion 31c by the step portion 31a as a boundary, and the large diameter portion 31b is inserted from the upper side in the Figure into a shaft hole 21 of the bearing 20, and the flange 32 is faced to an upper end surface 22 of the bearing 20. The radial load of the rotating shaft 30 is supported in the inner peripheral surface 23 of the bearing 20, and the thrust load of the rotating shaft 30 is supported in the upper end surface 22 of the bearing 20.

A gap between the inner peripheral surface 23 of the bearing 20 and the outer peripheral surface of the shaft body 31 and a gap between the upper end surface 22 of the bearing 20 and the under surface 32a of the flange 32 are a bearing gap at the radial side 41 and a bearing gap at the thrust side 42, respectively, and lubricating oil is supplied at these gaps 41 and 42. The bearing gap at the radial side 41 is set at 1 to 3 μm, and the bearing gap at the thrust side 42 is set at 2 to 6 μm as described as follows in detail.

A cover member 13 which consists of a ring-shaped plate is fixed at an end portion of the opening of the housing 10. By the cover member 13, the above lubricating oil is prevented from scattering, and furthermore, the flange 32 of the rotating shaft 30 which is floated by the thrust fluid dynamic pressure comes into contact with the cover member 13, so as to prevent the rotating shaft 30 from coming out.

As shown in FIG. 2, plural spiral grooves 24 are formed at equal intervals on the upper end surface 22 of the bearing 20, and the spiral grooves 24 extend so as to inwardly curve toward the rotation direction R of the rotating shaft 30 (oblique lines are drawn in order to distinguish from the upper end surface 22, in FIG. 2). End portions on the peripheral sides of the spiral grooves 24 open to the peripheral surface, and end portions on the inner peripheral sides of the spiral grooves 24 do not open to the inner peripheral surface 23 so as to be closed. The number of the spiral grooves 24 is about 10 (12 in FIG. 2), and the maximum depth of the spiral groove 24 is about 10 μm.

As shown in FIG. 3, plural separation grooves 25 are formed at equal intervals in a circumferential direction on the inner peripheral surface 23 of the shaft hole 21 of the bearing 20. The separation grooves 25 are semicircular arcs in cross section, and extend straight from one end surface to the other end surface in an axial direction. Eccentric grooves 26 are formed between the respective separation grooves 25 of the inner peripheral surface 23. Centers of the eccentric grooves 26 are eccentric with respect to an axial center P of an outer diameter of the bearing 20, and the eccentric grooves 26 are inwardly biased toward one rotation direction of the rotating shaft 30 shown by an arrow R. In this case, as shown in the Figures, the number of the separation grooves 25 is 5, and the number of the eccentric grooves 26 is 5. These numbers are desirably 3 to 6.

A small gap between the inner peripheral surface of the eccentric grooves 26 and the outer peripheral surface of the rotating shaft 30 is wedge-shaped in cross section so as to be gradually narrower and smaller in the rotation direction of the rotating shaft 30. In this case, a width of the separation groove 25 corresponds to an angle θ of 8 to 20 degrees in the circumferential direction having the axial center P of the fluid dynamic pressure bearing 20 as a center as shown in FIG. 3, and the maximum depth of the separation groove 14 is about 0.10 mm.

The bearing 20 of the embodiment is a sintered bearing formed by compacting a raw metallic powder into a green compact and sintering the green compact. Since the bearing 20 is the sintered bearing, spiral grooves 24, separation grooves 25 and eccentric grooves 26, can be easily formed by plastic forming. For example, an inner peripheral surface 23 of the bearing 20 can be formed by press-fitting a male pin into the axial hole of a material of the sintered bearing. The male pin enables forming the separation grooves 25 and the eccentric grooves 26. Spiral grooves 24 can be formed by pressing a punch on an end surface of a material of the sintered bearing. The punch has plural protrusions enabling forming spiral grooves 24. Since the sintered bearing is porous, the spring-back amount is small, and the spiral grooves 24, the separation grooves 25 and the eccentric grooves 26, can be formed with high accuracy by plastic working.

A raw powder of the sintered bearing is desirably used as a material powder, in which an Fe powder, a Cu powder, and a Sn powder are contained, the amount of Fe being nearly equal to the amount of Cu contained, and the amount of Sn being a few wt %. For example, the amount of Fe is 40 to 60 wt %, the amount of Cu is 40 to 60 wt %, and the amount of Sn is 1 to 5 wt %. In this component, the bearing is strong not only due to the characteristics of the sintered member of which the main component is Cu which is good for working, but also by including large amounts of Fe. The affinity and the plastic working to the rotating shaft 30 are improved by including Sn. Therefore, the spiral grooves 24, the separation grooves 25 and the eccentric grooves 26, can be easily formed by plastic working as described above, and the friction coefficient is reduced so that abrasion resistance is improved.

A lubricating oil is impregnated into the above bearing 20, so that the above bearing 20 is an oil-impregnated bearing. The rotating shaft 30 inserted into the shaft hole 21 is rotated in the arrow R direction as shown in FIGS. 2 and 3, the lubricating oil is exuded to the respective separation grooves 25 of the inner peripheral surface 23 and is held therein. The lubricating oil held therein is efficiently moved by the rotating shaft 30, and enters into the wedge-shaped small gap between the eccentric grooves 26 and the rotating shaft 30, so that an oil film is formed. The lubricating oil entering the small gap flows to the narrower side thereof, and it thereby is under high pressure due to the wedge effect, so that a high radial dynamic pressure is generated. Portions under high pressure in the oil film are generated at equal intervals in the peripheral direction in accordance with the eccentric grooves 26. As a result, the radial load of the rotating shaft 30 is supported in a well-balanced manner so as to have high rigidity.

Figure 4:
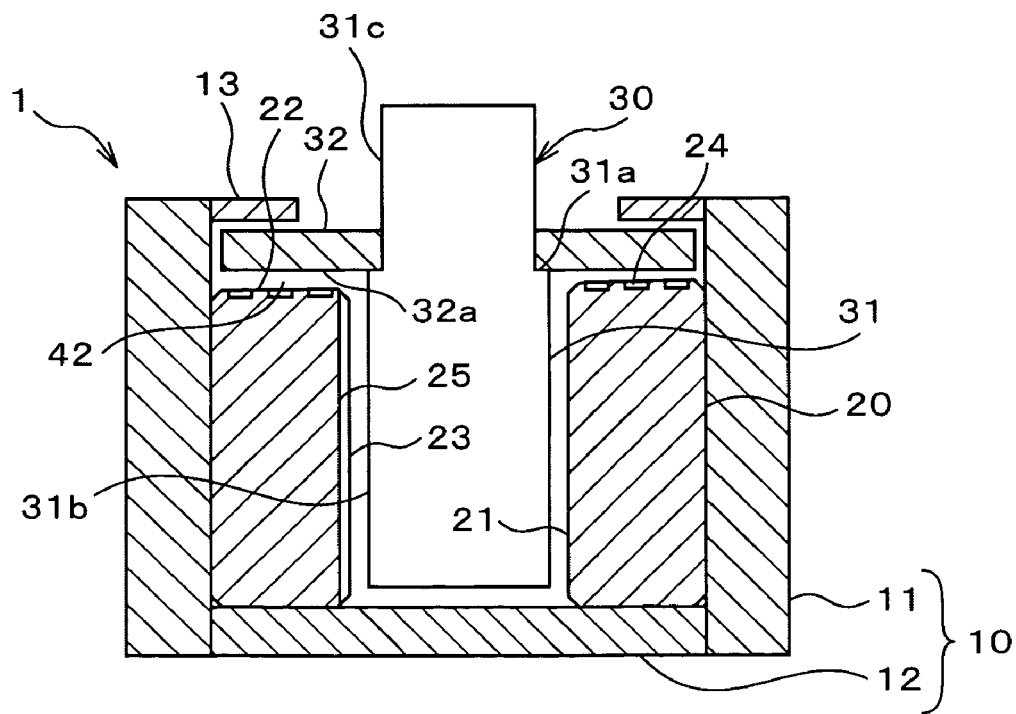
FIG. 4 is a longitudinal cross sectional view of a fluid dynamic pressure bearing unit in which a rotating shaft floats.

On the other hand, the lubricating oil is exuded to the respective spiral grooves 24 formed on the upper end surface 22 of the bearing 20 and is held therein. One portion of the lubricating oil held therein is discharged from the respective spiral grooves 24 by the rotation of the rotating shaft 30, so that an oil film thereof is formed between the upper end surface 22 and the flange 32. The lubricating oil held in the respective spiral grooves 24 flows from the peripheral side to the inner peripheral side, so that thrust dynamic pressure which is highest at an end portion on the inner peripheral side is generated. The thrust dynamic pressure is received by the flange 32, so that the rotating shaft 30 is floated by a small amount as shown in FIG. 4. As a result, the radial load of the shaft 2 is supported in a well-balanced manner so as to have high rigidity.

It is necessary that the floating height of the rotating shaft 30 at a temperature of about 60° C. be 6 μm or more when a magnetic recording disk is rotated and driven. Although it was explained that the bearing gap 41 at the radial side was about 1 to 3 μm, the shaft swing of the rotating shaft 30 is decreased to below the micron level to the submicron level by this value. In particular, in order to guarantee increased recording density of the magnetic recording disk, it is necessary to decrease an NRRO value (non repeatable run out value) to 0.05 μm or less, and therefore, the floatability of the rotating shaft 30 and bearing rigidity in both of radial and thrust are very important.

In the fluid dynamic pressure bearing unit 1 of the present embodiment, the under surface 32a of the flange 32 of the rotating shaft 30 is worked at an accuracy in which squareness to an axial direction of the shaft body 31 is 1 μm by cutting work, etc. In the meantime, the upper end surface 22 of the bearing 20 which faces to the under surface 32a of the flange 32 is slightly inclined to one direction, as shown in FIGS. 1 and 5. In the fluid dynamic pressure bearing unit 1, when an inclining height of the upper end surface 22 is δ, the outer diameter of the bearing 20, D, the length in an axial direction of the bearing 20, L, and a radial gap between large diameter portion 31b of the shaft body 31 of the rotating shaft 30 and the inner peripheral surface 23 of the bearing 20, C, (reference numeral 41 in the Figure) satisfy the expression L/D<C/δ. Specifically, in the case in which the inner diameter of the bearing 20 is 1 to 3 mm and the outer diameter of the bearing 20, D, and the length in an axial direction of the bearing 20, L, are optional, the inclining height of the upper end surface of the bearing 20, 6, is set to be 2 to 6 μm, and the gap at a radial side, C, is set to be 1 to 3 μm.

Figure 5A:
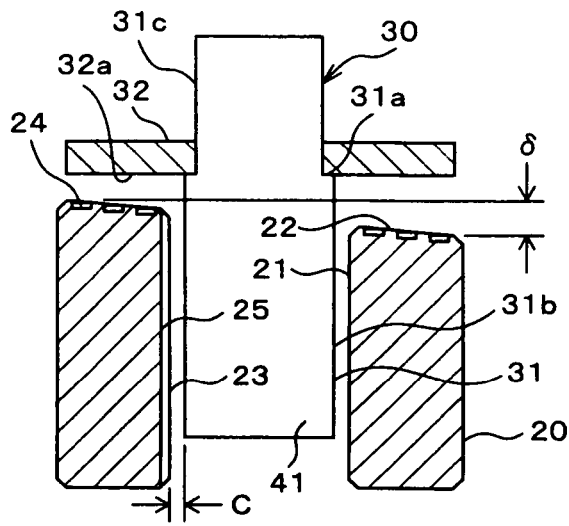
FIGS. 5A and 5B are longitudinal cross sectional views of fluid dynamic pressure bearing units before and after a rotating shaft is inserted into a bearing.
Figure 5B:
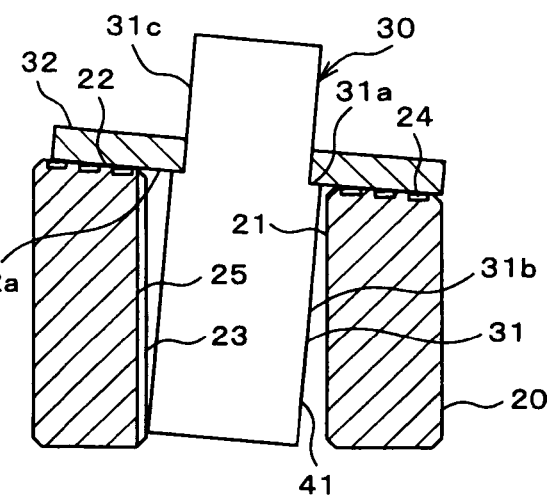

According to the fluid dynamic pressure bearing unit 1 of the present embodiment, the flange 32 of the rotating shaft 30 comes into contact with the upper end surface 22 of the bearing 20 by satisfying the expression L/D<C/δ, and the shaft body 31 does not come into contact with the inner peripheral surface 23 of the bearing 20, even if the rotating shaft 30 is inclined. FIGS. 5A and 5B show the fluid dynamic pressure bearing units before and after the shaft body 31 of the rotating shaft 30 is inserted into the shaft hole 21 of the bearing 20. In FIG. 5A, when C is δ, that is, when C/δ is 1, the shaft body 31 comes into contact with the upper end and the lower end of the inner peripheral surface of the bearing 20. However, in order to prevent contact, each size may be set, so that the relationships in the expression L/D<C/δ are maintained.

For example, when the material of the rotating shaft 30 (both of the shaft body 31 and the flange 32) is made from stainless steel according to Japanese Industrial Standard SUS420J2 and the bearing 20 is made from brass or is a copper or iron-copper sintered bearing, the gap C at a radial side between the bearing 20 and the rotating shaft 30 is decreased as the temperature decreases, and the relationships in the expression L/D≧C/δ are often satisfied. The relationship is due to the thermal expansion difference of the rotating shaft 30 and the bearing 20, and in order to ensure the gap C at a radial side even under such low temperature conditions, for example, the inclining height δ of the upper end surface 22 of the bearing 20 is adjusted, so that the relationships in the expression L/D<C/δ are satisfied. In particular, when the inclining height δ of the upper end surface 22 of the bearing 20 is set to be 2 to 6 μm, viscous friction at a thrust side can be prevented from remarkably increasing and smooth starting can be obtained.

Here, it was explained that the bearing 20 is a sintered bearing; however, it may be made from ingot material such as brass, stainless steel, etc., and in this case, the spiral groove 24 may be formed by chemical etching or electrical discharge machining.

EXAMPLES

Next, examples of the present invention will be explained, and the effects of the present invention will be confirmed.

A raw powder having the composition shown in Table 1 was compacted into a green compact, and the green compact was sintered, so that the required amount of materials for a cylindrical sintered bearing was obtained. The material of a sintered bearing had a true density ratio of 6.3 to 7.2%, an outer diameter of 6 mm, and an axial direction length of 5 mm.

TABLE 1

| Cu | Sn | Fe | (wt %) |
|---|---|---|---|
| 40 to 60 | 1 to 5 | 40 to 60 | |

Next, with respect to the materials of a sintered bearing, spiral grooves, separation grooves and eccentric grooves, which were the same as those shown in FIGS. 2 and 3, were formed by plastic working, so as to produce sintered bearings. Then, the sintered bearings were press-fitted into a steel housing, and an ester oil was impregnated thereinto as lubricating oil. Next, plural rotating shafts which adjusted the squareness of the flange were inserted into the sinter bearing, respectively, and plural fluid dynamic pressure bearing units, which had the same structure as that shown in FIG. 1 and had a different inclining height of the upper end surface of the bearing, were produced.

Figure 6:
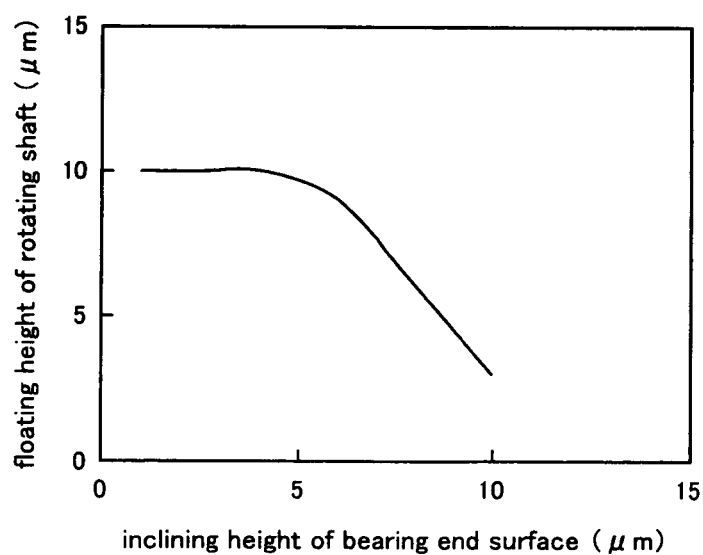
FIG. 6 is a diagram showing the relationship of floating height of a rotating shaft and inclining height of a bearing end surface measured in the Examples.

These fluid dynamic pressure bearing units were rotated at 4200 rpm, and at this time, the floating height of the rotating shaft was measured. FIG. 6 shows a diagram of the measured result, and according to the diagram, it was shown that the floating height of the rotating shaft rapidly decreased when the inclining height of the upper end surface of the bearing exceeded 6 μm. In the case in which the magnetic recording disk was rotated and driven, it was found that the floating height of the rotating shaft at about 60° C. must be 6 μm or more, and therefore, in order to reliably satisfy this condition, it was found that the inclining height must be 6 μm or less.

Figure 7:
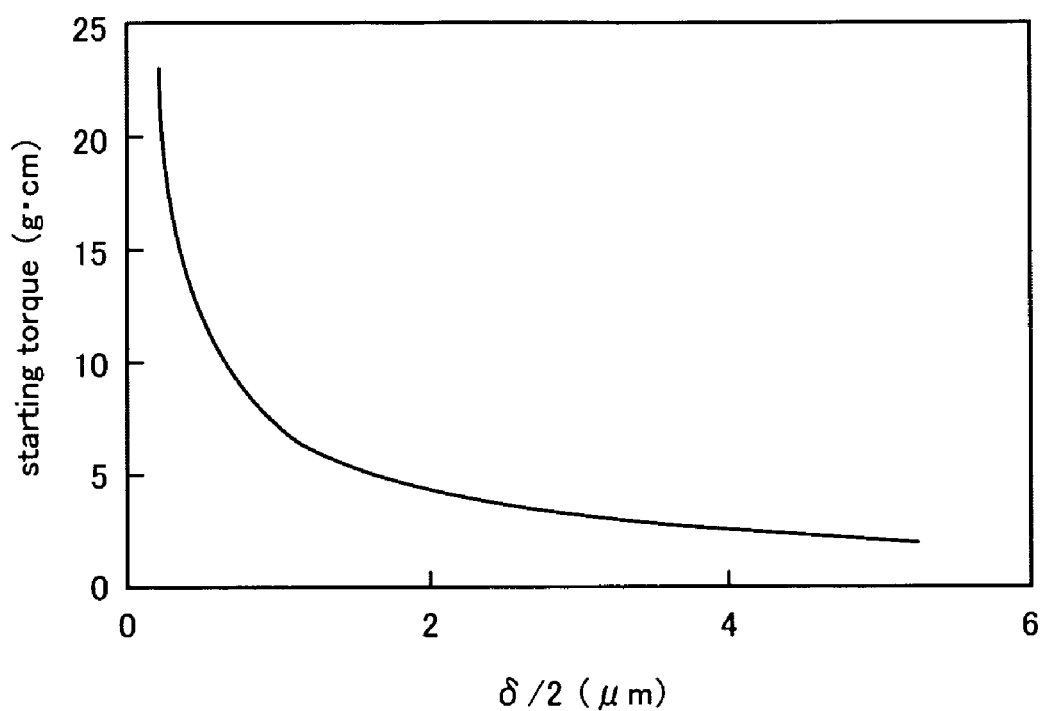
FIG. 7 is a diagram showing the relationship of a starting torque of a rotating shaft and inclining height of a bearing end surface measured in the Examples.

Then, FIG. 7 is a diagram showing the relationship of a bearing gap at a thrust side and a starting torque, and the diagram shows frictional properties in which viscous friction which is generated in the bearing gap at the thrust side is calculated as an apparent average gap according to the inclining height of the upper end surface of the bearing, δ, and the starting torque for rotating the rotating shaft when δ/2 is 3 μm is 1. As is apparent from FIG. 7, the bearing gap is inversely proportional to the starting torque, and the starting torque rapidly increases when δ/2 is 1 μm or less. Therefore, it was found that the bearing gap must be 2 μm or more.

What is claimed is:

1. A fluid dynamic pressure bearing unit comprising:
    a rotating shaft in which a flange is provided on a cylindrical shaft body; and
    a cylindrical bearing in which the shaft body of the rotating shaft is rotatably inserted and in which the flange is faced to a bearing end surface in this state, the bearing end surface being inclined with respect to the flange,
    wherein a thrust dynamic pressure groove is formed on one of faced surfaces of the flange and the bearing end surface,
    a radial dynamic pressure groove is formed on one of an inner peripheral surface of the bearing and an outer peripheral surface of the shaft body which faces the inner peripheral surface,
    a lubricating oil is supplied to a gap formed between the rotating shaft and the bearing, fluid dynamic pressure is generated by the lubricating oil supplied to the thrust dynamic pressure groove and the radial dynamic pressure groove when the rotating shaft rotates, the rotating shaft is supported in a thrust direction and a radial direction on the bearing under a non-contact condition by the dynamic pressure, and an outer diameter of the bearing, D, a length in an axial direction of the bearing, L, a gap at a radial side which is between the rotating shaft and the bearing, C, and an inclining height of the bearing end surface to which the flange is faced, δ, satisfy the expression L/D<C/δ.

2. The fluid dynamic pressure bearing unit according to claim 1, wherein the bearing is a sintered bearing.

3. The fluid dynamic pressure bearing unit according to claim 1, wherein the inclining height δ is set to be 2 to 6 μm by conducting plastic working to the bearing end surface.

4. The fluid dynamic pressure bearing unit according to claim 1, wherein the inner diameter of the bearing is set to be 1 to 3 μm and the gap at a radial side C is set to be 1 to 4 μm.

\* \* \* \* \*